June 25, 1946.　　　H. KNAPP　　　2,402,899
WATER HEATING APPARATUS
Filed Feb. 7, 1944
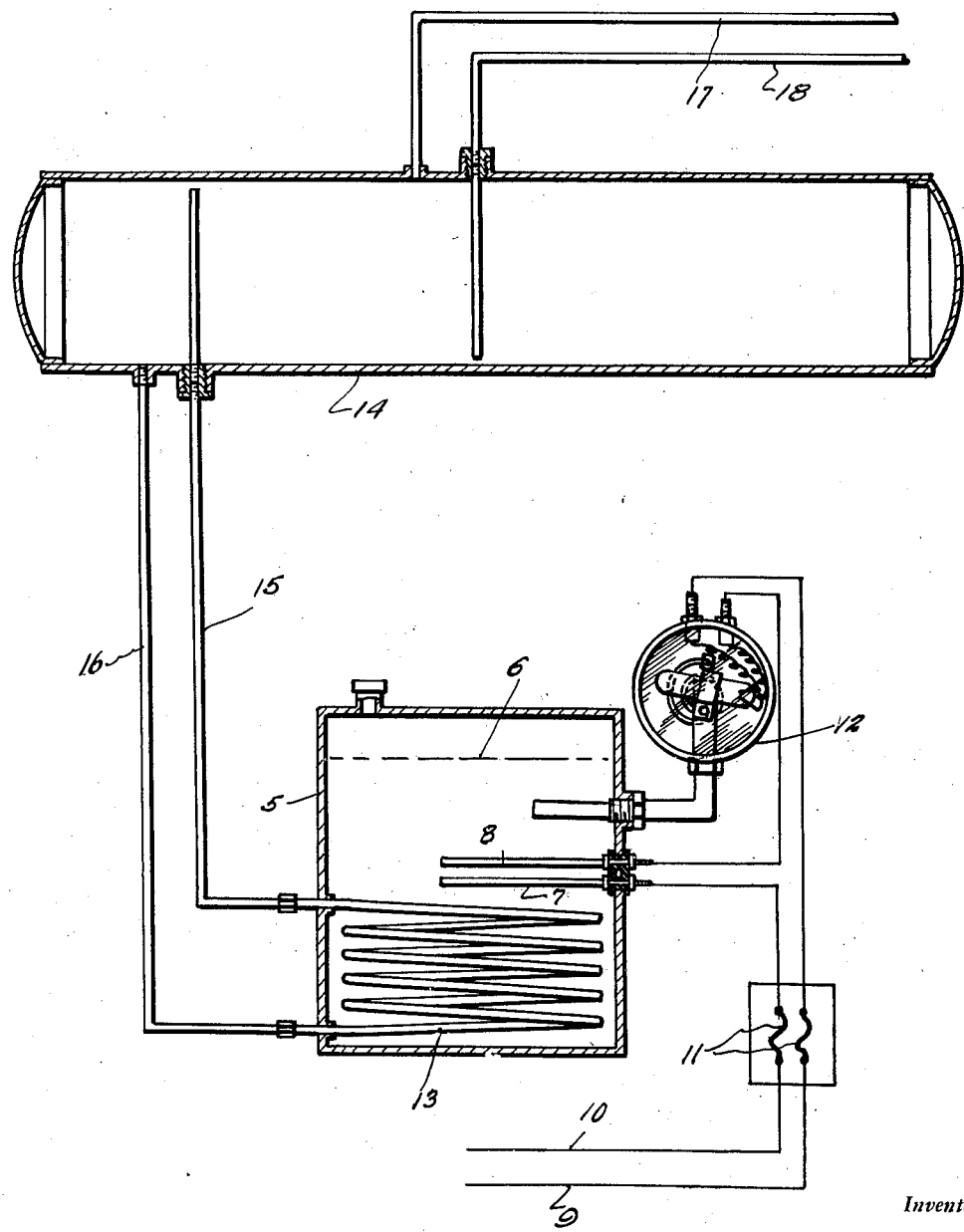
Inventor
Henry Knapp
By Clarence A. O'Brien
and Harvey B. Jacobson
Attorneys Patented June 25, 1946

2,402,899

UNITED STATES PATENT OFFICE 2,402,899

WATER-HEATING APPARATUS

Henry Knapp, Cranford, N. J.

Application February 7, 1944, Serial No. 521,407

1 Claim. (Cl. 219—39)

This invention relates to a novel and improved method of and apparatus for heating water for heating or power generation purposes, and the primary object of the invention is to provide for heating the water in an expeditious and economical manner.

In accordance with the present invention, a solution of salt and water is heated to the desired degree by passing electric current through the solution, and the water is heated by subjecting the same to the heating action of this heated solution while passing through a heating coil or similar heat exchange device. It has been found that such a solution, when heated in this way, may be very quickly brought to or above a boiling point, and that it will quickly and effectively heat water while circulating through a heating coil or similar heat exchange device, whereby the water may be used for heating purposes or may be converted to steam for power generating purposes.

The exact nature of the present invention will become more clearly apparent from the following description when considered in connection with the accompanying drawing, in which the view is one partly in section and partly diagrammatic, and illustrates one embodiment of the invention.

Referring in detail to the drawing, 5 indicates a closed tank which is substantially filled with a solution of salt and water, as at 6. This solution consists of a boiled mixture of substantially 8 parts of water to 1 part of salt, which mixture is boiled until the salt is completely dissolved so that the resultant solution will not congeal when it cools. The water used in making the solution is preferably distilled, and the salt may consist of ordinary table salt or calcium chloride, or its equivalent, such as equal parts of calcium chloride and tri-calcium phosphate.

The solution 6 is heated by passing electric current directly therethrough, and for this purpose spaced electrodes 7 and 8 project into the tank 5 below the level of the solution 6 and are connected to a suitable source of electricity by means of wires 9 and 10. Ordinary protective fuses 11 are provided in the wires 9 and 10, and interposed in the circuit of the electrodes 7 and 8 is an aquastat 12 of conventional form which stops and starts the heater 7, 8 to maintain predetermined temperature of the solution 6 and to stop the heater to prevent overheating of the solution 6. As usual, the aquastat 12 is adjustable to predetermine the temperature at which the solution 6 is heated.

Located in the lower portion of tank 5 is a heating coil 13 or equivalent heat exchange device through which water is circulated from a main storage tank 14 by way of circulatory connections 15 and 16. It will be seen that the water from storage tank 14, which is of considerably greater capacity than the tank 5, will be subjected to the heating action of the hot solution 6 in passing through the coil 13. As the solution is brought quickly to or above a boiling point, as desired, in the manner described, the water passing through the coil 13 will be quickly and effectively heated thereby. The tank 14 has water or steam outlet and water inlet pipes 17 and 18, respectively, which may lead to any point of use of the hot water or steam generated. Thus, the generated hot water or steam may be utilized for heating or power purposes.

From the foregoing description, it is believed that the nature and advantages of the present invention will be readily understood and appreciated by those skilled in the art.

What I claim as new is:

An apparatus for heating water comprising a closed tank containing a low-resistance solution, means embodying spaced electrodes included in a circuit for passing a current of electricity directly through said solution for heating the same, a heat exchange device in the tank submerged in the solution, a water storage tank having inlet and outlet pipe connections, circulatory connections between said heat exchange device and said storage tank, and an adjustable aquastat having a thermo-sensitive element subjected to the temperature of the solution and interposed in the circuit of the electrodes to control the temperature to which the solution is heated.

HENRY KNAPP.